US00RE50680E

(19) United States
(12) Reissued Patent
Pasinski

(10) Patent Number: US RE50,680 E
(45) Date of Reissued Patent: Dec. 2, 2025

(54) MOVEABLE PAINT TRAY

(71) Applicant: Tom Pasinski, Chicago, IL (US)

(72) Inventor: Tom Pasinski, Chicago, IL (US)

(21) Appl. No.: 17/021,966

(22) Filed: Sep. 15, 2020

Related U.S. Patent Documents

Reissue of:
(64) Patent No.: 10,076,927
Issued: Sep. 18, 2018
Appl. No.: 14/810,512
Filed: Jul. 28, 2015

U.S. Applications:
(60) Provisional application No. 62/032,654, filed on Aug. 4, 2014.

(51) Int. Cl.
*B44D 3/12* (2006.01)
*B05C 17/02* (2006.01)

(52) U.S. Cl.
CPC ..... *B44D 3/126* (2013.01); *B05C 17/0245* (2013.01)

(58) Field of Classification Search
CPC ..... B44D 3/126; B05C 17/0245
USPC ..... 15/257.05, 257.06
See application file for complete search history.

(56) References Cited

U.S. PATENT DOCUMENTS 3,733,577 A 5/1973 Hammond
4,509,226 A * 4/1985 Allison ..... B44D 3/126 15/257.06
5,201,439 A * 4/1993 Davies ..... B44D 3/126 206/361
5,984,129 A 11/1999 Pasinski
8,733,577 B2 * 5/2014 Patterson ..... A45F 3/46 206/192
9,168,781 B1 * 10/2015 Cooper ..... B44D 3/126
2004/0226954 A1 * 11/2004 Pasinski ..... B44D 3/126 220/570
2006/0225959 A1 * 10/2006 Pohl ..... B44D 3/126 182/129
2007/0204423 A1 * 9/2007 Keane ..... B44D 3/12 15/257.06
2014/0096338 A1 * 4/2014 Enguita ..... B44D 3/126 15/257.06

OTHER PUBLICATIONS

Definition of "Lateral", Collins Dictionary (Year: 2023).*
Definition of "perspective (graphical)", www.definitions.net (Year: 2023).*

* cited by examiner

*Primary Examiner* — Terrence R Till
(74) *Attorney, Agent, or Firm* — AVEK IP, LLC

(57) ABSTRACT

The moveable paint tray preferably includes a base ring, a peripheral wall, a sloped ramp, an engagement platform, a handle and a hood. The peripheral wall extends upward from an outer perimeter of the base ring. A liquid support surface is formed in a portion of an inner perimeter of the base ring. The sloped ramp extends upward from an end of the liquid support surface. The engagement platform extends from an end of the sloped ramp. A ramp wall extends inward and upward from an inner perimeter of the base ring to the sloped ramp and the engagement platform. The handle extends from an outer perimeter of the peripheral wall, adjacent the engagement platform. A drain spout is formed through the peripheral wall on an end opposite the handle. A second embodiment of the moveable paint tray does not include a hood for nesting multiple units together.

28 Claims, 4 Drawing Sheets

MOVEABLE PAINT TRAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

This is a [utility patent application taking priority from] *reissue application of U.S. Pat. No. 10,076,927, which claims priority to* provisional application No. 62/032,654 filed on Aug. 4, 2014.

BACKGROUND OF THE INVENTION

1. Field of the Invention

The present invention relates generally to paint trays and more specifically to a moveable paint tray, which retains liquid for application to a paint roller in a one-piece plastic structure.

2. Discussion of the Prior Art

U.S. Pat. No. 5,984,129 to Paskinski discloses a movable paint tray assembly for applying a liquid to a roller. However, Paskinski does not teach or suggest a paint tray fabricated from a single piece of molded material.

Accordingly, there is a clearly felt need in the art for a moveable paint tray, which may be used to retain liquid for application to a paint roller in a one-piece plastic molded structure.

SUMMARY OF THE INVENTION

The present invention provides a moveable paint tray, which retains liquid for application to a paint roller in a one-piece molded structure. The moveable paint tray preferably includes a base ring, a peripheral wall, a sloped ramp, an engagement platform, a handle and a hood. The moveable paint tray is created with a plastic blow molding process. The peripheral wall extends upward from an outer perimeter of the base ring. The peripheral wall preferably includes an outwardly sloping cross section. A liquid fill line is formed in a portion of the peripheral wall. A liquid support surface is formed in a portion of an inner perimeter of the base ring. The sloped ramp extends upward from an end of the liquid support surface. The engagement platform extends from an end of the sloped ramp. A top of the engagement platform is disposed below a top edge of the peripheral wall. A paint roller cavity is formed in the engagement platform to receive an end of a paint roller.

A ramp wall extends inward and upward from the inner perimeter of the base ring. The ramp wall extends upward to each end of the sloped ramp and an outer perimeter of the engagement platform. A liquid trough is formed between the peripheral wall and the ramp wall and communicates with the liquid support surface. The handle extends from an outer perimeter of the peripheral wall, adjacent the engagement platform. A drain spout is formed through the peripheral wall on an end opposite the handle. The drain spout is preferably sealed with a removable cap. The hood covers a portion of the liquid support surface. The hood extends from a portion of a top edge of the peripheral wall.

A second embodiment of the moveable paint tray does not include a hood. The second embodiment of the moveable paint tray is created with plastic injection molding. In use, a liquid, such as paint is poured over the liquid support surface, until the liquid fill line is reached. The paint will flow into and around the liquid trough. Paint is drained from the removal tray by removing the removable cap and pouring the paint into a container. The moveable paint tray may be transported in a vertical orientation, while retaining a volume of paint.

Accordingly, it is an object of the present invention to provide a moveable paint tray, which may be used to retain liquid for application to a paint roller in a one-piece molded structure.

These and additional objects, advantages, features and benefits of the present invention will become apparent from the following specification.

DETAILED DESCRIPTION OF THE PREFERRED EMBODIMENTS

Figure 1:
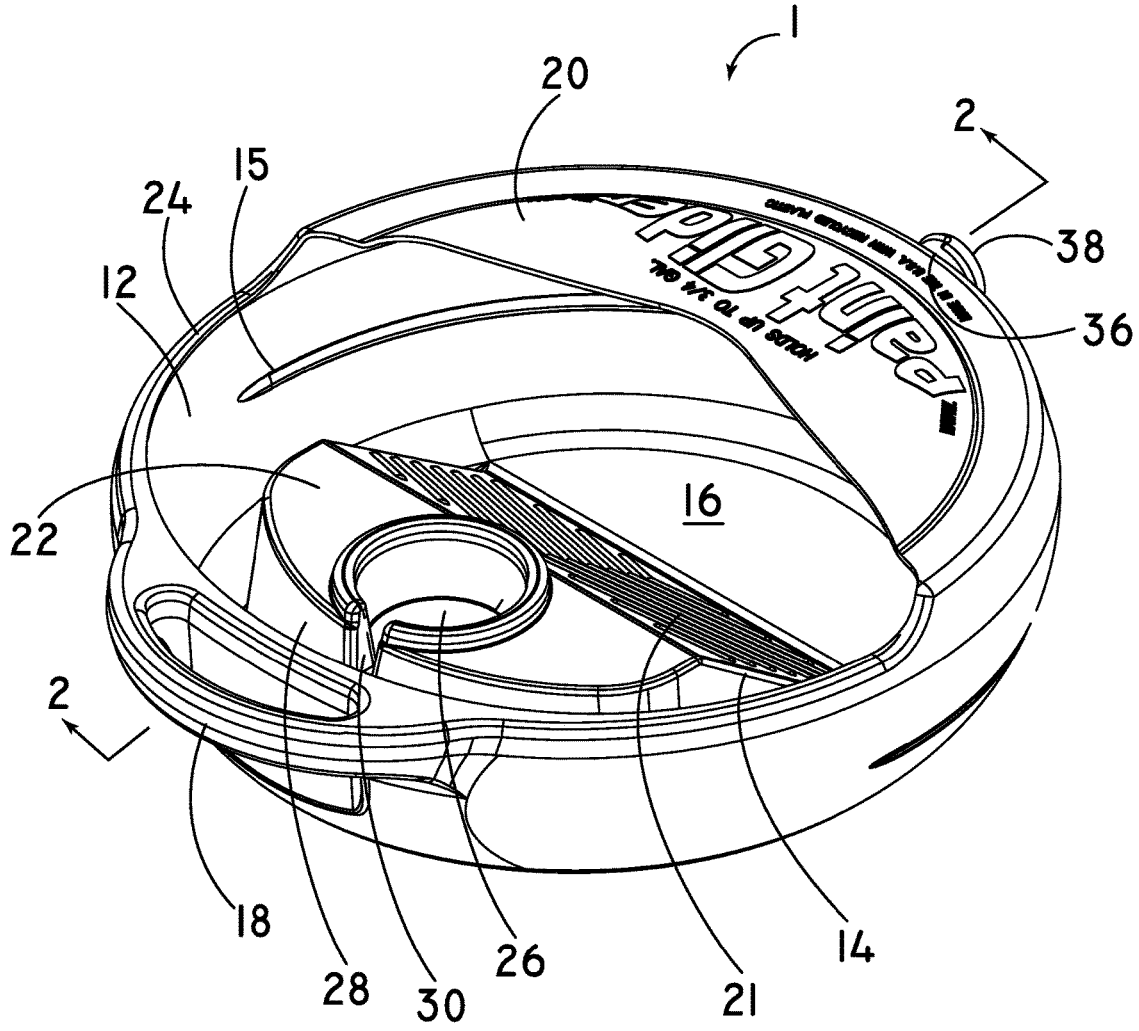
FIG. 1 is a top perspective view of a moveable paint tray in accordance with the present invention.
Figure 2:
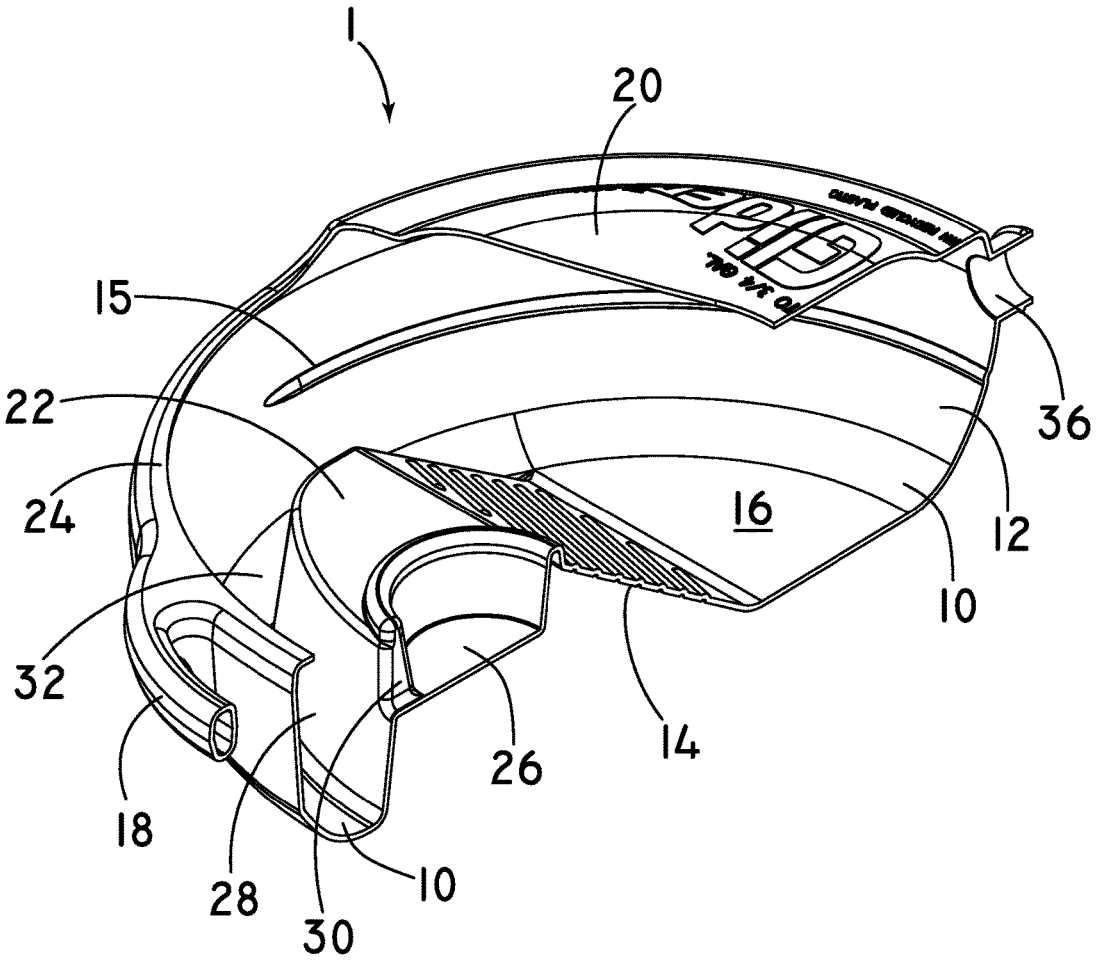
FIG. 2 is a cross sectional perspective view of a moveable paint tray cut through FIG. 1 in accordance with the present invention.
Figure 3:
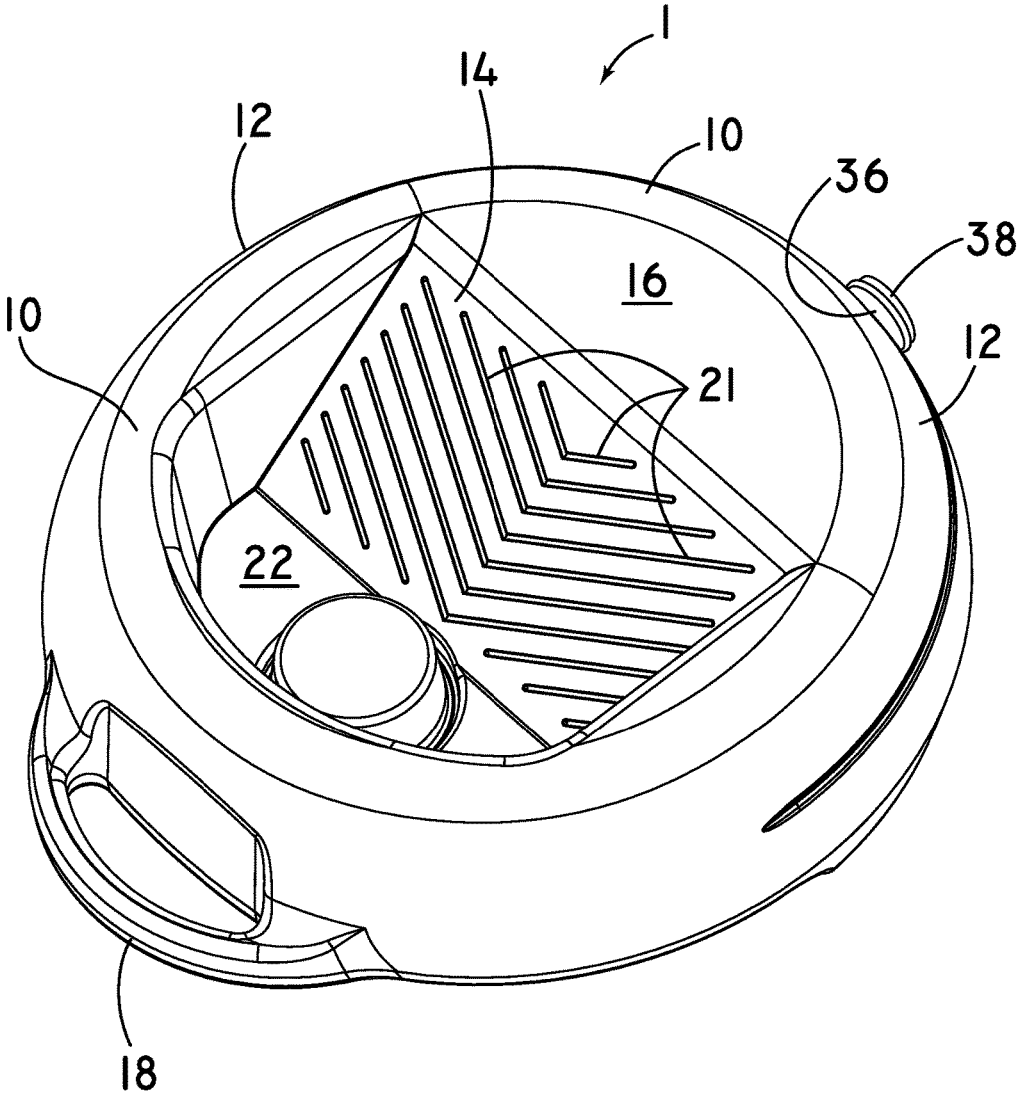
FIG. 3 is a bottom perspective view of a moveable paint tray in accordance with the present invention.

With reference now to the drawings, and particularly to FIG. 1, there is shown a top perspective view of a moveable paint tray 1. With reference to FIGS. 2-3, the moveable paint tray 1 preferably includes a base ring 10, a peripheral wall 12, a sloped ramp 14, an engagement platform [16] *22*, a handle 18 and a hood 20. The moveable paint tray 1 is created with a plastic blow molding process. The base ring 10 preferably includes a curved cross section. Only a small portion of the base ring 10 actually contacts a support surface. The small contact portion allows the moveable paint tray 1 to be pulled across drop cloth or rotated on the drop cloth. The peripheral wall 12 extends upward from an outer perimeter of the base ring 10. The peripheral wall 12 preferably includes an outwardly sloping cross section. A liquid fill line 15 is formed in a portion of the peripheral wall 12.

The liquid support surface 16 extends from a portion of an inner perimeter of the base ring 10. The sloped ramp 14 extends upward from an end of the liquid support surface 16. A plurality of projections 21 are formed in the sloped ramp 14 to extract excess paint from a paint roller (not shown). The engagement platform 22 extends from an end of the sloped ramp 14 in a substantially horizontal plane. A top of the engagement platform [18] *22* is disposed below a top edge 24 of the peripheral wall 12. A paint roller cavity 26 is formed in the engagement platform 22 to receive an end of a paint roller (not shown).

A ramp wall 28 extends inward and upward from the inner perimeter of the base ring 10. The ramp wall 28 extends upward to each end of the sloped ramp 14 and an outer perimeter of the engagement platform 22. A drain slot 30 is formed through the ramp wall 28 to provide drainage for the paint roller cavity 26. A liquid trough 32 is formed between the peripheral wall 12 and the ramp wall 28 and communicates with the liquid support surface 16. The handle 18 extends from an outer perimeter of the peripheral wall 12, adjacent the engagement platform [20] *22*. A drain spout 36 is formed through the peripheral wall 12 on an end opposite the handle 18. The drain spout 36 is preferably sealed with a removable cap 38. The hood 20 covers a portion of the liquid support surface 16. The hood 20 extends from a portion of the top edge 24 of the peripheral wall 12.

In use, a liquid, such as paint is poured over the liquid support surface 16, until the liquid fill line 15 is reached. The paint will flow into and around the liquid trough 32. Paint is drained from the moveable removal tray 1 by removing the removable cap 38 and pouring the paint into a paint container through the drain spout 36. The hood 20 allows the moveable paint tray 1 to be transported in a vertical orientation, while retaining a volume of paint.

Figure 4:
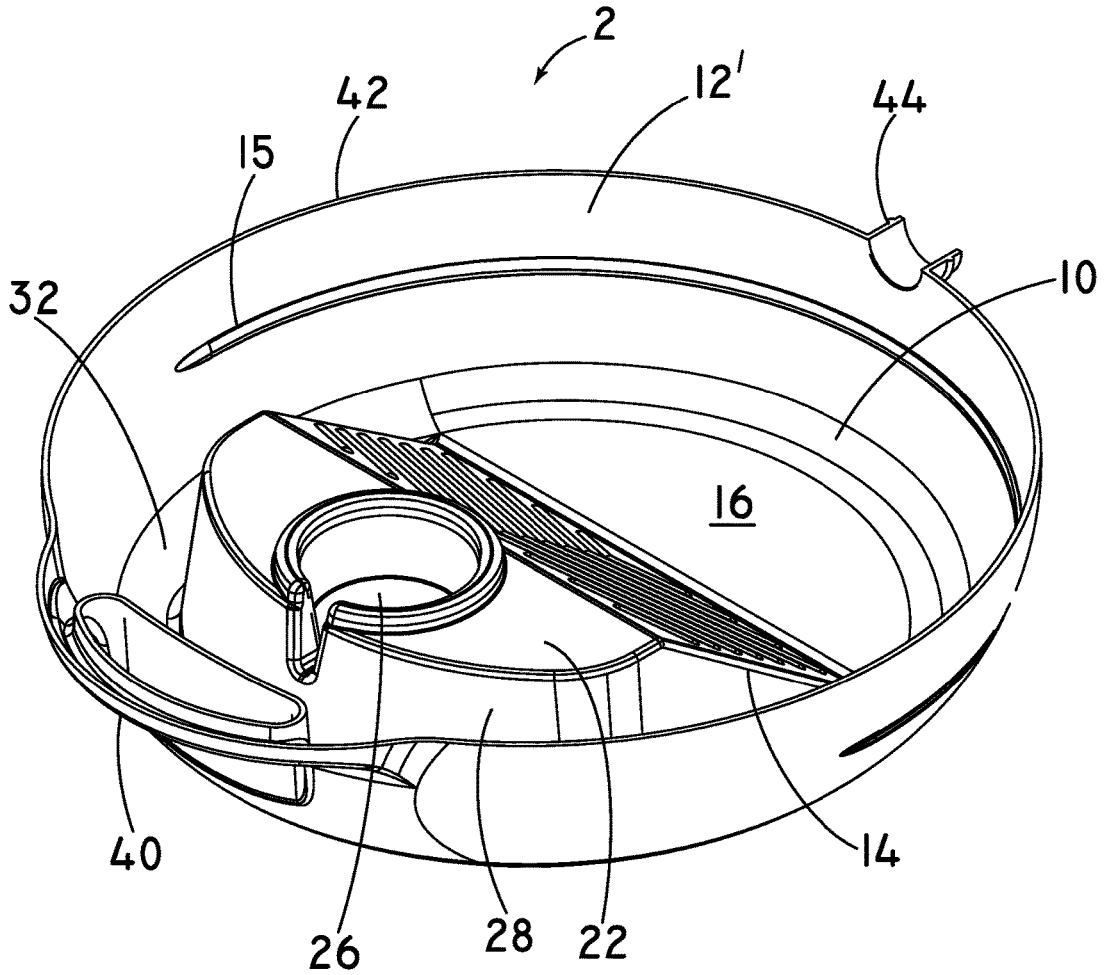
FIG. 4 is a top perspective view of a second embodiment of a moveable paint tray in accordance with the present invention.

With reference to FIG. 4, a moveable paint tray 2 is created with plastic injection molding. The moveable paint tray 2 preferably includes the base ring 10, a peripheral wall 12', the sloped ramp 14, the engagement platform 16 and a handle 40. The moveable paint tray 2 is created with a plastic injection process. The lack of hood 20 allows the moveable paint tray 2 to be nested together for efficient shipping. The peripheral wall 12' extends upward from an outer perimeter of the base ring 10. The liquid fill line 15 is formed in a portion of the peripheral wall 12'. The liquid support surface 16 extends from a portion of an inner perimeter of the base ring 10. The sloped ramp 14 extends upward from an end of the liquid support surface 16. The plurality of projections 21 are formed in the sloped ramp 14. The engagement platform 22 extends from an end of the sloped ramp 14. A top of the engagement platform 22 is disposed below a top edge 42 of the peripheral wall 12. The paint roller cavity 26 is formed in the engagement platform 22 to receive an end of a paint roller.

The ramp wall 28 extends inward and upward from the inner perimeter of the base ring 10. The ramp wall 28 extends upward to each end of the sloped ramp 14 and to the outer perimeter of the engagement platform 22. The drain slot 30 is formed through the ramp wall 28 to provide drainage for the paint roller cavity 26. The liquid trough 32 is formed between the peripheral wall 12 and the ramp wall 28. The handle [42] *40* extends from an outer perimeter *42* of the peripheral wall 12', adjacent the engagement platform 20. A drain spout boss 44 is formed in the peripheral wall 12 on an end opposite the handle 42. In use, a liquid, such as paint is poured over the liquid support surface 16, until the liquid fill line 15 is reached. The paint will flow into and around the liquid trough 32. Paint is drained from the moveable removal tray 2 by tilting thereof and pouring the paint into a paint container through the drain spout boss 44.

*As shown in FIGS. 2 and 3, at least a portion of the liquid trough (or "curved rear paint collecting area") 32 is on the same level as at least a portion of the liquid support surface (or "floor") 16.*

*As shown in FIG. 4, the peripheral wall 12' includes a first lateral exterior wall portion on one side of a longitudinal axis, a second lateral exterior wall portion on an opposite side of the longitudinal axis, a front exterior wall portion, and a rear exterior wall portion.*

*As shown in FIG. 4, the ramp 14 includes a first lateral end and a second (opposite) lateral end.*

*As shown in FIG. 4, a first lateral paint collecting area is defined between the first lateral end of the ramp 14 and the first lateral exterior wall portion; a second lateral paint collecting area is defined between the second lateral end of the ramp 14 and the second lateral exterior wall portion; the curved rear paint collecting area 32 is defined between the platform 22 and the rear exterior wall portion; and the longitudinal axis passes through the curved rear paint collecting area 32.*

*As shown in FIG. 3, the first lateral exterior wall portion, the second lateral exterior wall portion, the front exterior wall portion, and the rear exterior wall portion—which form the peripheral wall 12'—are collectively circular.*

*As shown in FIG. 4, a top of the first lateral exterior wall portion, a top of the second lateral exterior wall portion, a top of the front exterior wall portion, and a top of the rear exterior wall portion—which portions collectively form the peripheral wall 12'—are coplanar. In other words, the top of the first lateral exterior wall portion, the top of the second lateral exterior wall portion, the top of the front exterior wall portion, and the top of the rear exterior wall portion—which portions collectively form the peripheral wall 12'—are located in a plane.*

*As shown in FIG. 2, the bottom of the rear paint collecting area 32 is coplanar with an upper surface of the floor 16.*

*As shown in FIG. 4, the rear exterior wall portion of the peripheral wall 12' is round, the platform 22 has proximal and distal ends, the proximal end of the platform 22 is at the top end of the ramp 14 and the distal end of the platform 22 is round.*

*As shown in FIG. 4, a first ramp wall extends from the first lateral end of the ramp 14 and defines part of the first lateral paint collecting area, and a second ramp wall extends from the second lateral end of the ramp 14 and defines part of the second lateral paint collecting area.*

*As shown in FIG. 4, the first lateral paint collecting area is in communication with a front paint collecting area that is partially defined by the floor 16, and the second lateral paint collecting area is in communication with the front paint collecting area.*

*As shown in FIGS. 1-4, a bottom of the front exterior wall portion is coplanar with a bottom of the rear exterior wall portion, and the front exterior wall portion is immovably fixed relative to the rear exterior wall portion.*

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A moveable paint tray comprising:

a base ring having an inner perimeter and an outer perimeter;

a peripheral wall extending outward from [an] *said* outer perimeter of said base ring;

a liquid support surface [extends] *extending* inward from a portion of said inner perimeter of said base ring;

a sloped ramp [extends] *extending* upward from an end of said liquid support surface;

an engagement platform [extends] *extending* from an end of said sloped ramp, a top of said engagement platform [is] *being* located below a top edge of said peripheral wall;

a ramp wall [extends] *extending* upward from said inner perimeter of said base ring to said sloped ramp and said engagement platform[, wherein a liquid is poured on to said liquid support surface, a roller is placed into the liquid]; and a drain opening [is] formed through said peripheral wall, said drain opening [is] *being* located near a top of said peripheral wall.

2. The moveable paint tray of claim 1, further comprising:

a handle [extends] *extending* from an outer surface of said peripheral wall, said handle [is] *being* located adjacent said engagement platform.

3. The moveable paint tray of claim 2 wherein:

said drain opening is formed through said peripheral wall on an end opposite of said handle.

4. The moveable paint tray of claim 1 wherein:

a paint roller cavity is formed in said engagement platform to receive an end of a paint roller, *and* a drain slot is formed through said ramp wall to provide drainage for said paint roller cavity.

[5. The moveable paint tray of claim 1 wherein:

said moveable paint tray is created by a plastic blow molding process.]

[6. The moveable paint tray of claim 1 wherein:

said moveable paint tray is created by a plastic injection process.]

7. The moveable paint tray of claim 1 wherein:

a hood extends upward from said top edge of said peripheral wall, *and* said drain opening is located adjacent said hood.

8. A moveable paint tray comprising:

a base ring having an inner perimeter and an outer perimeter;

a peripheral wall extending outward from an outer perimeter of said base ring;

a liquid support surface [extends] *extending* inward from a portion of said inner perimeter of said base ring;

a sloped ramp [extends] *extending* upward from an end of said liquid support surface;

an engagement platform [extends] *extending* from an end of said sloped ramp, a top of said engagement platform [is] *being* located below a top edge of said peripheral wall;

a ramp wall [extends] *extending* upward from said inner perimeter of said base ring to said sloped ramp and said engagement platform[, wherein a liquid is poured on to said liquid support surface, a roller is placed into the liquid]; and a paint roller cavity [is] formed in said engagement platform to receive an end of a paint roller, a drain slot [is] formed through said ramp wall to provide drainage for said paint roller cavity, said paint roller cavity having a vertical axis.

9. The moveable paint tray of claim 8, further comprising:

a handle [extends] *extending* from an outer surface of said peripheral wall, said handle [is] *being* located adjacent said engagement platform.

10. The moveable paint tray of claim 9 wherein:

a drain device is formed through said peripheral wall on an end opposite of said handle.

11. The moveable paint tray of claim 10 wherein:

a hood extends upward from said top edge of said peripheral wall, *and* said drain device is located adjacent said hood.

[12. The moveable paint tray of claim 8 wherein:

said moveable paint tray is created by a plastic blow molding process.]

[13. The moveable paint tray of claim 8 wherein:

said moveable paint tray is created by a plastic injection process.]

14. A moveable paint tray comprising:

a base ring having an inner perimeter and an outer perimeter;

a peripheral wall extending outward from an outer perimeter of said base ring;

a liquid support surface [extends] *extending* inward from a portion of said inner perimeter of said base ring;

a sloped ramp [extends] *extending* upward from an end of said liquid support surface;

an engagement platform [extends] *extending* from an end of said sloped ramp; and a ramp wall [extends] *extending* upward from said inner perimeter of said base ring to said sloped ramp and said engagement platform, a liquid trough [is] *being* created between said peripheral wall and ramp wall, said liquid trough [communicates] *communicating* with said liquid support surface, said liquid trough [is] *being* on the same level as said liquid support surface, said liquid trough and said liquid support surface [surround] *surrounding* said engagement platform.

15. The moveable paint tray of claim 14, further comprising:

a handle [extends] *extending* from an outer surface of said peripheral wall, said handle [is] *being* located adjacent said engagement platform.

16. The moveable paint tray of claim 15 wherein:

a drain device is formed through said peripheral wall on an end opposite of said handle.

17. The moveable paint tray of claim 14 wherein:

a paint roller cavity is formed in said engagement platform to receive an end of a paint roller, *and* a drain slot is formed through said ramp wall to provide drainage for said paint roller cavity.

[18. The moveable paint tray of claim 14 wherein:

said moveable paint tray is created by a plastic blow molding process.]

[19. The moveable paint tray of claim 14 wherein:

said moveable paint tray is created by a plastic injection process.]

*20. The moveable paint tray of claim 1, further comprising:*

*a liquid on said liquid support surface; and*

*a roller in said liquid.*

*21. The moveable paint tray of claim 8, further comprising:*

*a liquid on said liquid support surface; and*

*a roller in said liquid.*

*22. A moveable paint tray, comprising:*

*a longitudinal axis;*

*a first lateral exterior wall portion on one side of the longitudinal axis;*

*a second lateral exterior wall portion on an opposite side of the longitudinal axis;*

*a front exterior wall portion;*

*a rear exterior wall portion;*

*a ramp having a top end, a bottom end, a first lateral end, and a second lateral end; the first lateral end of the ramp being inset from the first lateral exterior wall portion; a first lateral paint collecting area defined between the first lateral end of the ramp and the first lateral exterior wall portion; the second lateral end of the ramp being inset from the second lateral exterior wall portion; a second lateral paint collecting area defined between the second lateral end of the ramp and the second lateral exterior wall portion;*

*a floor extending from the bottom end of the ramp to the front exterior wall portion; and*

*a platform extending from the top end of the ramp; a curved rear paint collecting area defined between the platform and the rear exterior wall portion, the longitudinal axis passing through the curved rear paint collecting area;*

*wherein at least a portion of the curved rear paint collecting area is on the same level as at least a portion of the floor.*

*23. The moveable paint tray of claim 22, wherein the first lateral exterior wall portion, the second lateral exterior wall portion, the front exterior wall portion, and the rear exterior wall portion are collectively circular.*

*24. The moveable paint tray of claim 22, wherein:*

*the ramp is generally planar;*

*the platform is generally planar;*

*a top of the first lateral exterior wall portion, a top of the second lateral exterior wall portion, a top of the front exterior wall portion, and a top of the rear exterior wall portion are coplanar.*

*25. The moveable paint tray of claim 24, wherein the platform is located between the floor and the plane in which the top of the first lateral exterior wall portion, the top of the second lateral exterior wall portion, the top of the front exterior wall portion, and the top of the rear exterior wall portion are located.*

*26. The moveable paint tray of claim 22, wherein a bottom of the rear paint collecting area is coplanar with an upper surface of the floor.*

*27. The moveable paint tray of claim 26, wherein:*

*the rear exterior wall portion is curved;*

*the platform has proximal and distal ends;*

*the proximal end of the platform is at the top end of the ramp; and*

*the distal end of the platform is curved.*

*28. The moveable paint tray of claim 27, wherein:*

*a first ramp wall extends from the first lateral end of the ramp and defines part of the first lateral paint collecting area; and*

*a second ramp wall extends from the second lateral end of the ramp and defines part of the second lateral paint collecting area.*

*29. The moveable paint tray of claim 28, wherein:*

*the first lateral paint collecting area is in communication with a front paint collecting area that is partially defined by the floor; and*

*the second lateral paint collecting area is in communication with the front paint collecting area.*

*30. The moveable paint tray of claim 22, wherein:*

*the rear exterior wall portion is curved;*

*the platform has proximal and distal ends;*

*the proximal end of the platform is at the top end of the ramp; and*

*the distal end of the platform is curved.*

*31. The moveable paint tray of claim 22, wherein:*

*a first ramp wall extends from the first lateral end of the ramp and defines part of the first lateral paint collecting area; and*

*a second ramp wall extends from the second lateral end of the ramp and defines part of the second lateral paint collecting area.*

*32. The moveable paint tray of claim 8, wherein a plurality of projections adapted to extract excess paint from a paint roller are formed in the ramp.*

*33. The moveable paint tray of claim 14, wherein a plurality of projections adapted to extract excess paint from a paint roller are formed in the ramp.*

*34. The moveable paint tray of claim 22, wherein a plurality of projections adapted to extract excess paint from a paint roller are formed in the ramp.*

* * * * *